(12) United States Patent
Zhu et al.

(10) Patent No.: US 11,489,230 B2
(45) Date of Patent: Nov. 1, 2022

(54) BATTERY MODULE AND BATTERY PACK

(71) Applicant: Contemporary Amperex Technology Co., Limited, Ningde (CN)

(72) Inventors: Xianchun Zhu, Ningde (CN); Chao Zeng, Ningde (CN); Hua Cao, Ningde (CN); Mu Qian, Ningde (CN)

(73) Assignee: Contempory Amperex Technology Co., Limited, Ningde (CN)

( * ) Notice: Subject to any disclaimer, the term of this patent is extended or adjusted under 35 U.S.C. 154(b) by 221 days.

(21) Appl. No.: 16/678,125

(22) Filed: Nov. 8, 2019

(65) Prior Publication Data
US 2020/0350539 A1 Nov. 5, 2020

(30) Foreign Application Priority Data

Apr. 30, 2019 (CN) .......................... 201910361871.9

(51) Int. Cl.
*H01M 50/375* (2021.01)
(52) U.S. Cl.
CPC ...... *H01M 50/375* (2021.01); *H01M 2220/20* (2013.01)
(58) Field of Classification Search
CPC .......... H01M 50/375; H01M 2220/20; H01M 50/30; H01M 50/20; H01M 2200/103; H01M 10/486; H01M 2010/4271; H01M 10/425; H01M 10/42
See application file for complete search history.

(56) References Cited

U.S. PATENT DOCUMENTS

| | | | |
|---|---|---|---|
| 2010/0291426 A1* | 11/2010 | Zhou | H01M 50/583 429/99 |
| 2013/0200700 A1* | 8/2013 | Ohkura | H01M 10/48 320/136 |
| 2014/0335386 A1 | 11/2014 | Ikeya et al. | |
| 2016/0233555 A1 | 8/2016 | Pedtke et al. | |
| 2017/0144562 A1* | 5/2017 | Thomas | H01M 10/4257 |
| 2018/0151859 A1* | 5/2018 | Aizawa | H01M 50/502 |

(Continued)

FOREIGN PATENT DOCUMENTS

| | | |
|---|---|---|
| CN | 105762432 A | 7/2016 |
| CN | 105761532 B | 3/2018 |

(Continued)

OTHER PUBLICATIONS

Machine English translation of KR 2019-0032883 (Year: 2019).*

(Continued)

*Primary Examiner* — Michael L Dignan
(74) *Attorney, Agent, or Firm* — Suiter Swantz pc llo

(57) ABSTRACT

The present disclosure relates to the technical field of energy storage devices, and in particular, to a battery module and a battery pack. The battery module includes: a plurality of battery cells stacked in sequence, the plurality of battery cells being provided with vents; and a circuit board arranged above the plurality of battery cells. The circuit board is provided with a temperature sensing device, and a position of each of the temperature sensing device corresponds to positions of the vents. The temperature sensing device is connected to a battery management system to form a circuit, and the circuit is disconnected when any one of the vents is blasted.

13 Claims, 7 Drawing Sheets

(56) References Cited

U.S. PATENT DOCUMENTS

2019/0189382 A1* 6/2019 Holland ............... H01H 85/046
2020/0067061 A1* 2/2020 Wynn ................. H01M 50/502

FOREIGN PATENT DOCUMENTS

| CN | 207818702 U | 9/2018 |
|----|-------------|--------|
| CN | 108899464 A | 11/2018 |
| CN | 209526152 U | 10/2019 |
| KR | 20190032883 A | 3/2019 |
| WO | 2020220975 A1 | 11/2020 |

OTHER PUBLICATIONS

Search Report dated May 12, 2020 for European Application No. 19202921.3.
International Search Report in Application No. PCT/CN2020/084279 dated Jul. 7, 2020, 4 pages.

* cited by examiner

BATTERY MODULE AND BATTERY PACK

CROSS-REFERENCE TO RELATED APPLICATIONS

The present disclosure claims priority to Chinese Patent Application No. 201910361871.9, filed on Apr. 30, 2019, the content of which is incorporated herein by reference in its entirety.

TECHNICAL FIELD

The present disclosure relates to the technical field of energy storage devices, and in particular, to a battery module and a battery pack.

BACKGROUND

Currently, as power batteries have a higher and higher energy density, the market's demand for safety of the batteries also increases. When abuse occurs, thermal runaway for the battery is easy to appear, and high temperature and destructive power will quickly occur, which may burn through a top cover of a battery box and thus cause a fire, thereby resulting in a serious safety accident.

In the related art, temperature collection is performed only inside the battery module, and then a collected signal is transmitted to a vehicle control unit. However, a false signal occasionally occurs, thereby resulting in misjudgment.

SUMMARY

The present disclosure provides a battery module and a battery pack aiming to solve problems in the related art and improve accuracy of alarming a thermal runaway state of the battery module.

In a first aspect of the present disclosure, a battery module is provided. The battery module includes: a plurality of battery cells stacked in sequence, the plurality of battery cells being provided with vents; and a circuit board arranged above the plurality of battery cells. The circuit board is provided with a temperature sensing device, and a position of each of the temperature sensing devices corresponds to positions of the vents. The temperature sensing device is connected to a battery management system to form a circuit, and the circuit is disconnected when any one of the vents is blasted.

In an example, the temperature sensing device comprises at least one metal wire etched on the circuit board.

In an example, the circuit board includes a body and at least one through hole formed in the body, and a position of each of the at least one through hole corresponds to positions of one or more of the vents. The temperature sensing device includes at least one metal wire formed on the circuit board, and one of the at least one metal wire partitions one of the at least one through hole into a plurality of regions.

In an example, the at least one metal wire is etched on the circuit board.

In an example, the at least one metal wire includes a plurality of metal wires, and the plurality of metal wires are arranged in parallel and perpendicular to an extension direction of the at least one through hole in which the plurality of battery cells is stacked.

In an example, the at least one metal wire is fixed to the body.

In an example, the at least one metal wire is arranged above or below the at least one through hole, and one of the at least one metal wire has two ends fixed to two ends of the body outside of the at least one through hole along a length direction of the battery module.

In an example, the at least one metal wire extends along the length direction, and a projection of the at least one metal wire in a height direction of the battery module on a plane of the circuit board is partially located within a projection of the at least one through hole in the height direction of the battery module on the plane of the circuit board.

In an example, the at least one metal wire is arranged above or below the at least one through hole, and the at least one metal wire has two ends fixed to two ends of the body outside of the at least one through hole along a width direction of the battery module.

In an example, the at least one metal wire extends in the width direction, or a direction in which the at least one metal wire extends intersects a direction in which the at least one through hole extends, and a projection of the at least one metal wire in a height direction of the battery module is partially located within a projection of the at least one through hole in the height direction of the battery module.

In an example, the body is provided with at least one welding pad, and the at least one metal wire is fixed to the body through the at least one welding pad.

In an example, the at least one through hole includes a first through hole and a second through hole. The first through hole and the second through hole each have a strip shape. The first through hole and the second through hole each extend along a direction in which the vents are arranged.

In an example, each of the at least one metal wire is made of any one of copper, aluminum or tin.

In an example, the battery module further includes: a side plate fixed to a side of each of the plurality of battery cells; an end plate fixed to an end of each of the plurality of battery cells; and an isolation plate arranged above the plurality of battery cells. The isolation plate is provided with at least one gas exhaust hole, and the at least one gas exhaust hole corresponds to the vents. The circuit board is arranged on the isolation plate, and the temperature sensing device corresponds to the at least one gas exhaust hole.

In a second aspect, the present disclosure provides a battery pack, including a battery management system and the battery module as mentioned above. The temperature sensing device in the battery module is connected to the battery management system to form a circuit.

The technical solution provided by the present disclosure can achieve the following beneficial effects.

For the battery module and the battery pack provided by the present disclosure, the battery module includes a plurality of battery cells stacked in sequence and a circuit board, and the plurality of battery cells are provided with vents. The circuit board is provided with the temperature sensing device, and a position of the temperature sensing device corresponds to positions of the vents. The temperature sensing device is connected to a battery management system to form a circuit. The circuit is disconnected when any one of the vents is blasted and gas, liquid or fire is ejected from the plurality of battery cells, thereby performing alarming. In this way, accuracy of alarming the thermal runaway state of the battery module is improved.

It should be understood that the foregoing general description and the following detailed description are merely exemplary and are not intended to limit the present disclosure.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, other drawings can also be acquired by those skilled in the art without paying creative efforts.

REFERENCE NUMERALS

1—battery module;
11—battery cell;
111—vent;
112—case;
113—electrode assembly;
114—top cover assembly;
12—side plate;
13—end plate;
14—isolation plate;
141—gas exhaust hole;
15—circuit board;
151—temperature sensing device;
151a—metal wire;
152—body;
153—through hole;
153a—first through hole;
153b—second through hole;
154—welding pad;
155—welding pad connected to temperature warning device;
156—welding pad connected to voltage warning device;
16—upper cover;
17—bus bar.

The drawings described herein, which illustrate the embodiments of the present disclosure, are incorporated in and constitute a part of the specification, and used to explain the principles of the present application in combination with the specification.

DETAILED DESCRIPTION OF EMBODIMENTS

The technical solutions of the present disclosure will be clearly and thoroughly described as follow with reference to the accompanying drawings. It is obvious that the described embodiments are parts of the present disclosure, rather than all embodiments. Based on the embodiments of the present disclosure, all other embodiments obtained by those skilled in the art without paying any inventive efforts shall fall within the protection scope of the present disclosure.

Figure 1:
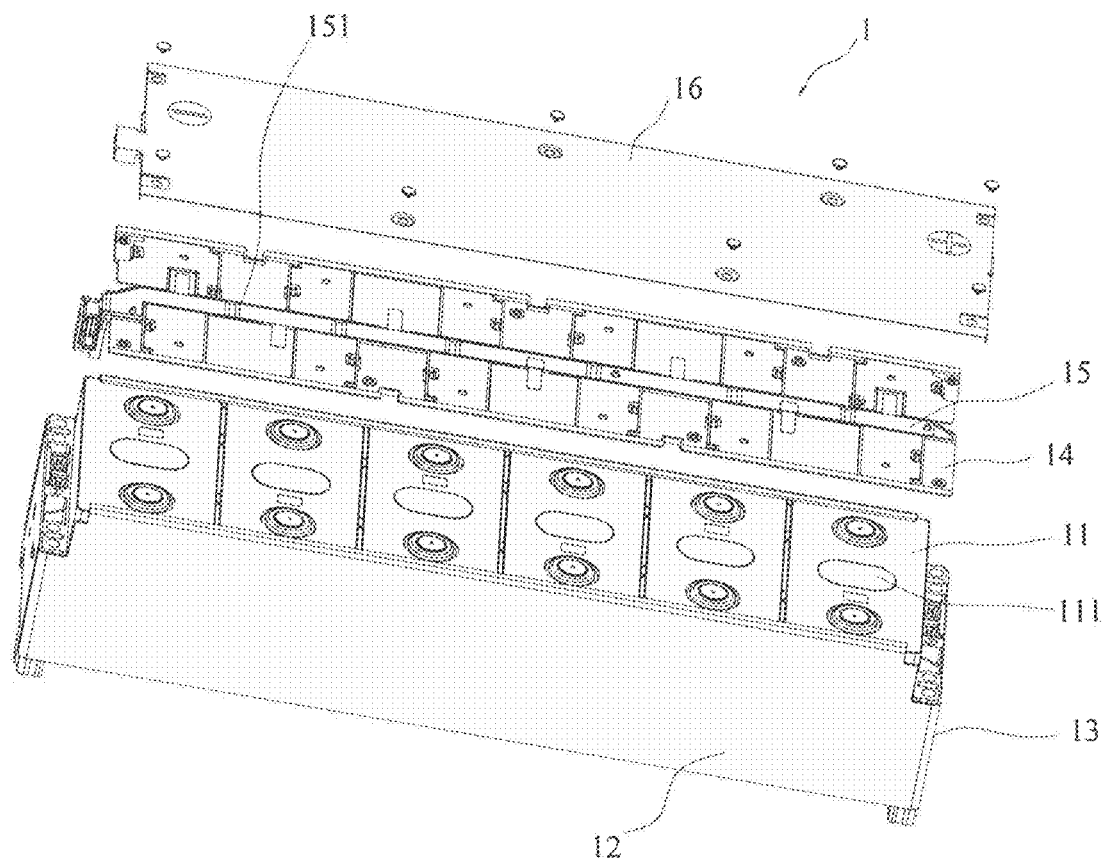
FIG. 1 is a schematic exploded view of a structure of a battery module according to an embodiment of the present disclosure.

FIG. 1 is a schematic exploded view of a structure of a battery module according to an embodiment of the present disclosure. As shown in FIG. 1, the embodiment of the present disclosure provides a battery module 1, including a plurality of battery cells 11 stacked in sequence.

Figure 2:
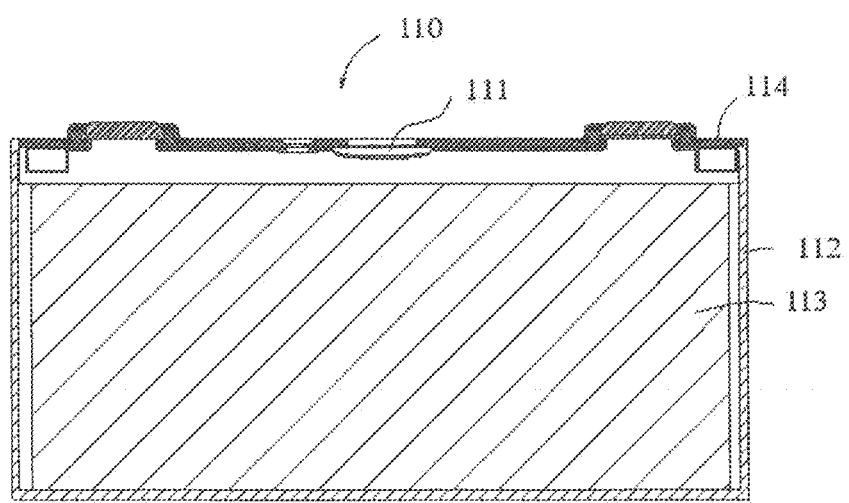
FIG. 2 is a front cross-sectional view of a structure of a battery cell.

FIG. 2 is a front cross-sectional view of a structure of a battery cell. As shown in FIG. 1 and FIG. 2, the battery cell 11 is provided with a vent 111. In particular, the battery cell 11 includes a case 112, an electrode assembly 113 and a top cover assembly 114. The vent 111 is arranged on the top cover assembly 114. The case 112 can have a hexahedral shape or other shape. The case 112 has an internal space in which the electrode assembly 113 and an electrolyte are received. The case 112 can be made of a material such as aluminum, aluminum alloy, or plastic.

The electrode assembly 113 can be formed by spirally winding a first electrode, a second electrode and a separator together around a winding axis. Here, the separator is an insulator located between the first electrode and the second electrode. The electrode assembly 113 reacts with the electrolyte and then outputs electric energy.

The battery module 1 further includes a circuit board 15 disposed above the battery cells 11, and the circuit board 15 can be in an FPC form or a PCB form and have a thickness of 0.1 mm to 2 mm and an insulativity greater than 500 MΩ. The circuit board 15 is provided with a temperature sensing device 151, and a position of the temperature sensing device 151 corresponds to that of the vent 111. The temperature sensing device 151 can be connected to a battery management system to form a circuit, which can be disconnected when the vent 111 is blasted.

When the battery is overcharged or other uncontrollable cases occur, a large amount of heat is generated inside the case 112 and the vent 111 is blasted, and then fire inside the battery cell 11 or gas or liquid of the high-temperature electrolyte inside the battery cell 11 will be ejected from the vent 111. Then, the ejected high-temperature electrolyte or fire will fuse the temperature sensing device 151, thereby disconnecting the formed circuit. A signal that the circuit has been disconnected can be fed back to the battery management system, which then can obtain accurate information on a thermal runaway state. It is also possible to perform an alarming action by connecting an alarm such as an alarm light or a buzzer in series in the circuit.

As shown in FIG. 1, the battery module 1 can further include a side plate 12 fixed to a side of the battery cells 11, an end plate 13 fixed to an end of the battery cells 11, and an isolation plate 14 disposed above the battery cells 11. The isolation plate 14 is provided with a gas exhaust hole (not shown) corresponding to the vent 111. The circuit board 15 is arranged on the isolation plate 14. The temperature sensing device 151 corresponds to the gas exhaust hole. An upper cover 16 covers the temperature sensing device 151 and the isolation plate 14, and the upper cover 16 is fixed to the isolation plate 14.

Figure 3:
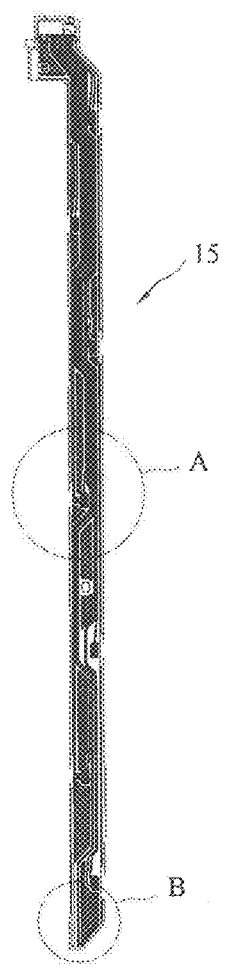
FIG. 3 is a schematic view of a structure of a circuit board in the battery module shown in FIG. 1.
Figure 4:
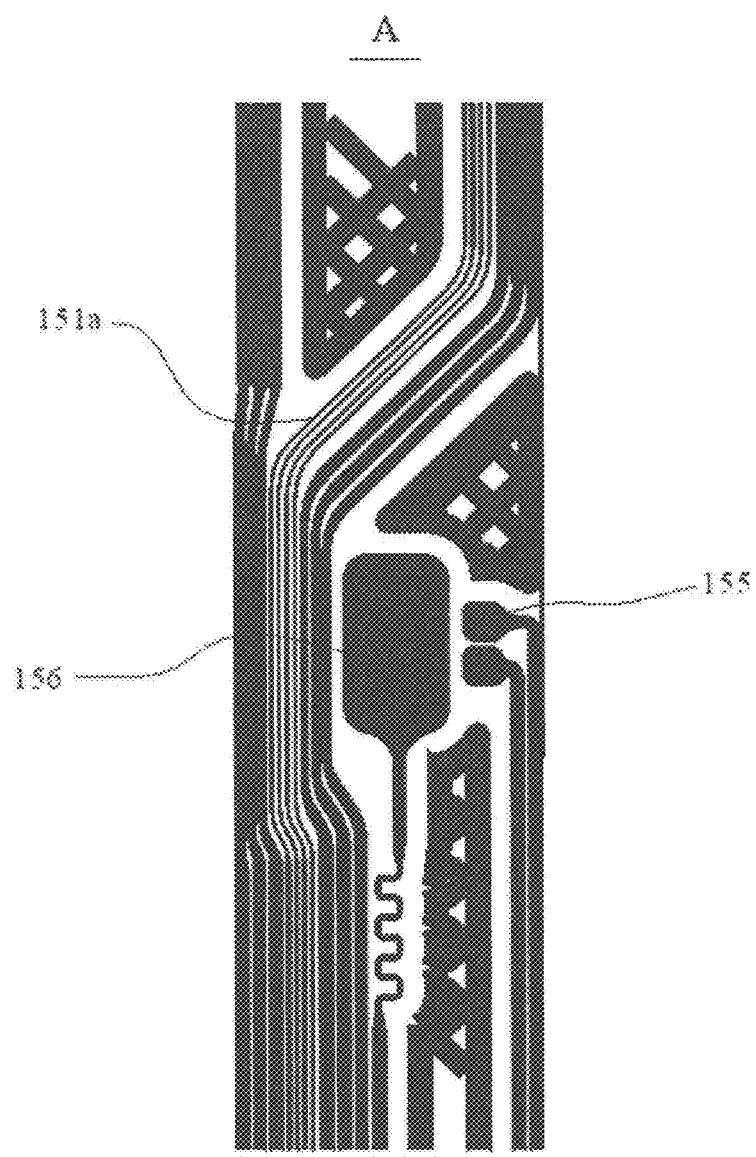
FIG. 4 is an enlarged view of a portion A shown in FIG. 3.
Figure 5:
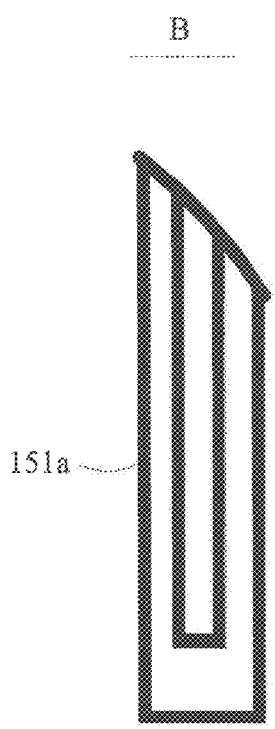
FIG. 5 is an enlarged view of a portion B shown in FIG. 3.

FIG. 3 is a schematic view of a structure of a circuit board in the battery module shown in FIG. 1, FIG. 4 is an enlarged view of a portion A shown in FIG. 3, and FIG. 5 is an enlarged view of a portion B shown in FIG. 3. As shown in FIG. 3 to FIG. 5, in an embodiment, the temperature sensing device 151 is a metal wire 151a directly etched on the circuit board 15. As shown in FIG. 4, the metal wire 151a can be a copper wire. When the circuit board is being etched, a copper wire connecting various components can be formed. In this embodiment, an extra copper wire can be formed directly during the etching, and is connected to the battery management system to form the above-mentioned circuit, e.g., the circuit formed in FIG. 5. Thus, when the battery module is in a thermal runaway state and the electrolyte is ejected from the vent 111, the copper wire formed on the circuit board 15 will be fused, so that the thermal runaway state of the battery module can be accurately reflected.

In addition, in the process of etching the metal wire 151a directly on the circuit board 15, a structure of the circuit board in the related art can be directly utilized without any change, which makes it easier to be implemented. Moreover, corresponding components in the battery module can also be directly used without any change, which results in lower cost. Moreover, the metal wire 151a is directly formed in the process of etching the circuit board, and thus an etching area of the circuit board can be minimized, thereby improving utilization of the material.

Figure 6:
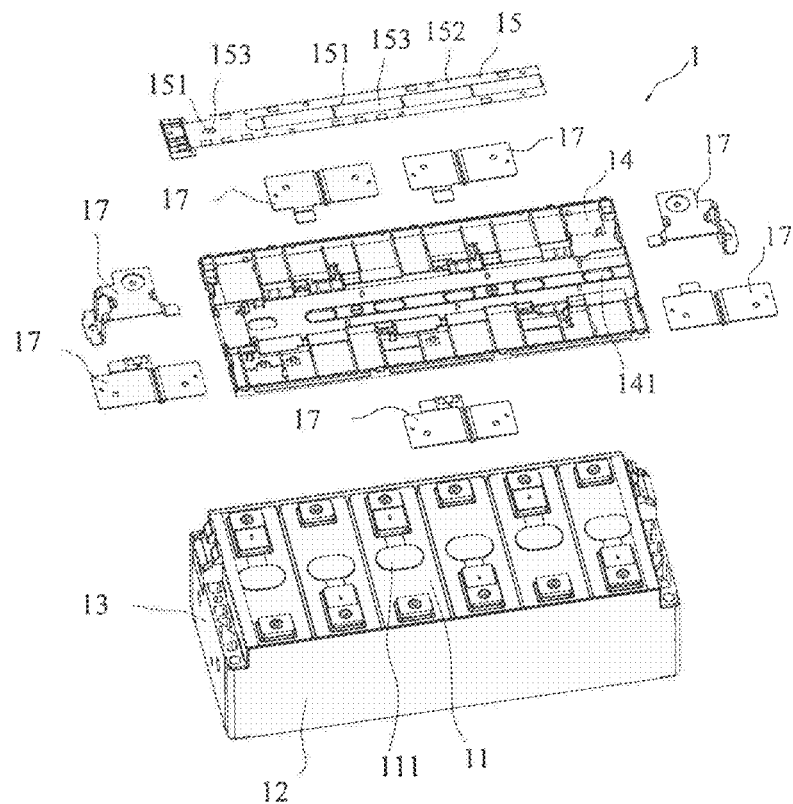
FIG. 6 is a schematic exploded view of a structure of a battery module according to another embodiment of the present disclosure.
Figure 7:
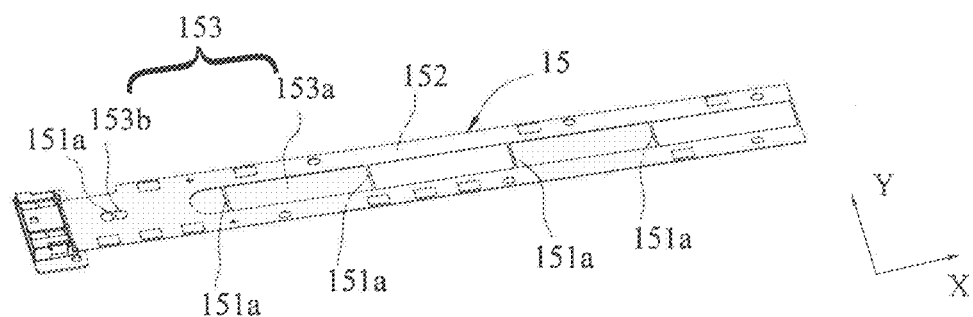
FIG. 7 is a schematic view of a structure of a circuit board in the battery module shown in FIG. 6.

FIG. 6 is a schematic exploded view of a structure of a battery module according to another embodiment of the present disclosure, and FIG. 7 is a schematic view of a structure of a circuit board in the battery module shown in FIG. 6. As shown in FIG. 6, in this embodiment, the battery module 1 includes battery cells 11, a side plate 12, an end plate 13, and an isolation plate 14. The isolation plate 14 has a gas exhaust hole 141, and the battery cells 11 are connected in series or in parallel through a bar bus 17. The battery module 1 further includes a circuit board 15, on which a temperature sensing device 151 is provided. The temperature sensing device 151 can be a metal wire 151a, and the metal wire 151a can be connected to the battery management system to form a circuit.

As an example, the circuit board 15 includes a body 152 and through holes 153 formed in the body 152. Positions of the through holes 153 correspond to those of the vents 111. The temperature sensing device 151 is a metal wire 151a formed on the circuit board 150, and the metal wire 151a partitions one through hole 153 into a plurality of regions.

As described above, the wire 151a may be directly formed during etching of the circuit board. In an example, the metal wire 151a can be in a curved shape, for example, an S-shape, and partition the through hole 153 into a plurality of regions. In another example, as shown in FIG. 6 and FIG. 7, a plurality of metal wires 151a can be provided to partition the through hole 153 provided in the body 152 of the circuit board 15 into a plurality of regions. In this case, when the electrolyte is ejected from the vent, an area of a part that the electrolyte breaks is reduced, and thus the metal wire 151a can be fused more directly and timely, thereby disconnecting the circuit formed by the metal wire 151a and other components on the circuit board 15. In this way, quick alarming can be achieved, and thus the thermal runaway state of the battery module can be timely and accurately reflected.

In an embodiment as shown in FIG. 6 and FIG. 7, the metal wire 151a is etched on circuit board 15. In the process of etching the circuit board 15, the metal wire 151a and the through hole 153 are directly formed. In this way, a structure of the circuit board in the related art can be directly used without any change, which makes it easier to be implemented. Moreover, corresponding components in the battery module can also be directly used without any change, which results in lower cost.

In addition, the metal wire 151a is etched on the circuit board 15. With such a structure, the metal wire 151a is disposed in the through hole 153 and formed into one piece with the body 152. The metal wire 151a is disposed inside the through hole 153, so that both an upper surface and a lower surface of the metal wire 151a can be flush with the body 152 of the circuit board 15 without protruding from surfaces of the body 152 of the circuit board 15. In this way, a reduced space can be occupied, thereby improving an energy density of the battery module 1.

As an example, a plurality of metal wires 151a can be provided. The plurality of metal wires 151a are arranged in parallel and are arranged in a direction perpendicular to an extending direction (X direction as shown in FIG. 7) of the through hole 153. When the plurality of metal wires 151a are arranged in parallel, each of the plurality of metal wires 151a may correspond to one vent 111. In this way, the circuit can be cut off when any battery cell 11 is in a thermal runaway state, thereby timey reflecting the thermal runaway state.

Figure 8:
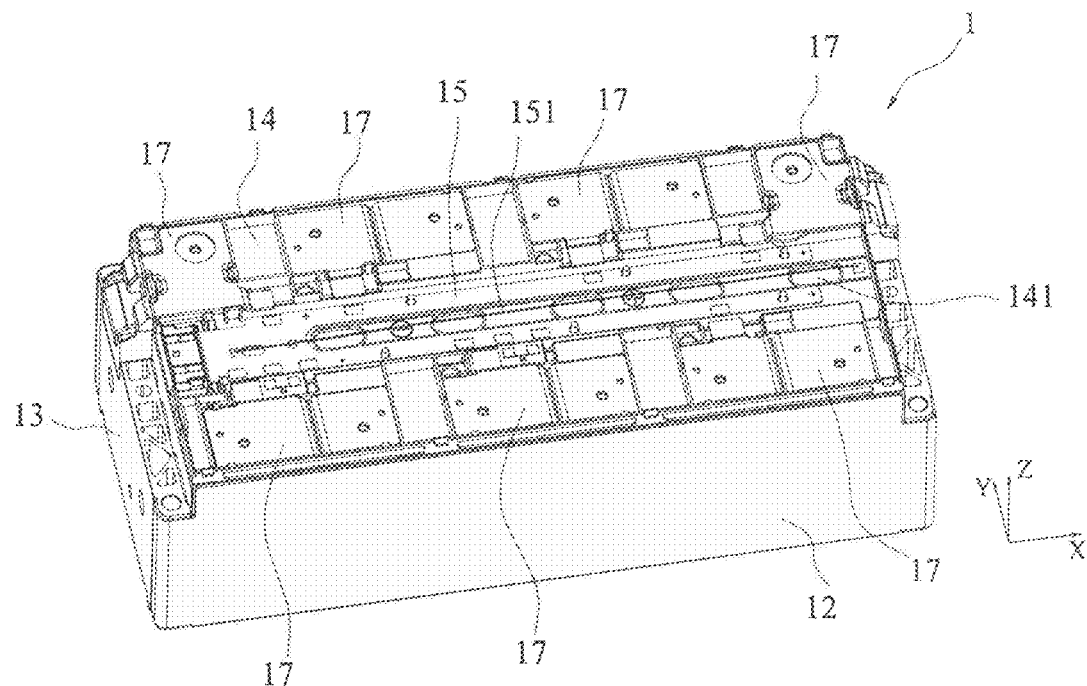
FIG. 8 is a schematic view of a structure of a battery module according to still another embodiment of the present disclosure.
Figure 9:
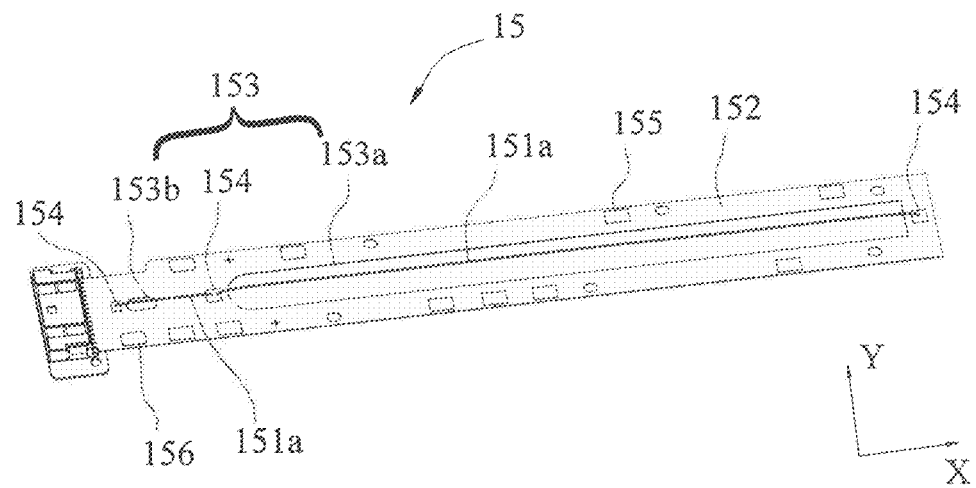
FIG. 9 is a schematic view of a structure of a circuit board in the battery module shown in FIG. 8.
Figure 10:
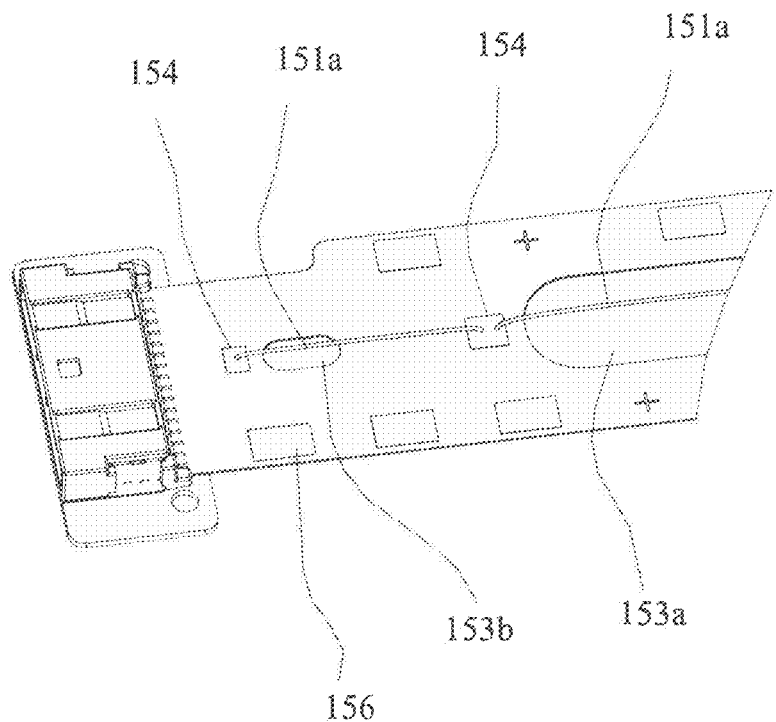
FIG. 10 is a partial enlarged view of FIG. 9.

FIG. 8 is a schematic view of a structure of a battery module according to still another embodiment of the present disclosure, FIG. 9 is a schematic view of a structure of a circuit board in the battery module shown in FIG. 8, and FIG. 10 is a partially enlarged view of FIG. 9. In an embodiment, different from the above-mentioned method in which the metal wire 151a is etched on the circuit board, the metal wire 151a can be fixed onto the body 151 of the circuit board 15 after the circuit board 15 is etched. In particular, the circuit board 15 includes a body 152 and a through hole 153 formed in the body 152. A position of the through hole 153 corresponds to that of the vent 111. The temperature sensing device 151 includes a metal wire 151a disposed at the through hole 153, and the metal wire 151a is fixed to the body 152.

In this embodiment, the metal wire 151a may be arranged above or below the through hole 153, and the metal wire 151a has its two ends fixed to two ends of the body 152 outside the through hole 153 along a length direction.

The metal wire 151a can be one metal wire extending along the length direction (X direction as shown in FIG. 8) of the battery module 1 and crossing the through hole 153 along the length direction of the through hole 153, so that one metal wire 151a can cross multiple vents 111 at the same time. In this way, any one battery cell 11 being in a thermal runaway state will fuse the wire 151a, thereby timely reflecting the thermal runaway state. Meanwhile, a projection of the above-mentioned metal wire 151a in a height direction (Z direction as shown in FIG. 8) of the battery module 1 is partially located within a projection of the through hole 153 in the height direction (Z direction as shown in FIG. 8) of the battery module 1, and thus the metal wire 151a passes center positions of all vents 111. In this way, the battery module being in a thermal runaway state can be indicated more accurately. As a size of the battery module in the related art is becoming larger, in order to avoid insufficient strength of the metal wire 151a caused by one metal wire 151a crossing multiple vents, one metal wire 151a can cross only 2 to 3 vents at the same time. This can guarantee the strength of the metal wire 151a can be guaranteed, while timely indicating that the battery module is in a thermal runaway state.

Figure 11:
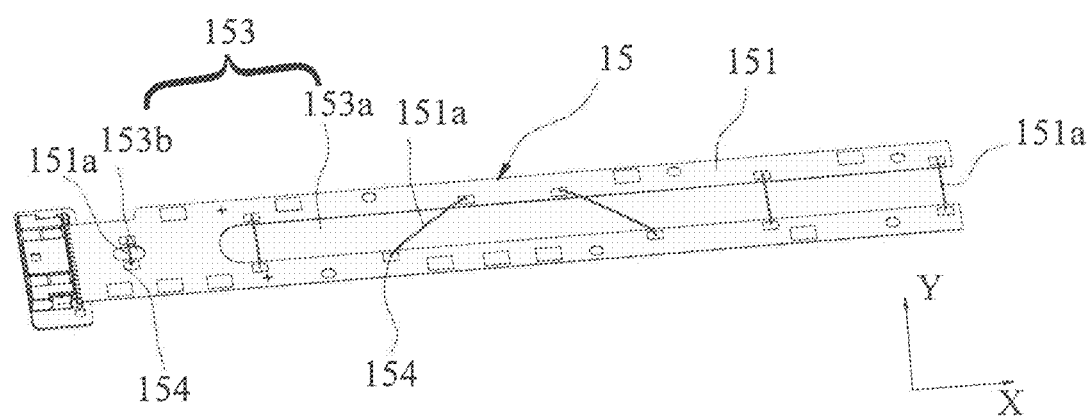
FIG. 11 is a schematic view of a structure of another circuit board.

FIG. 11 is a schematic view of a structure of another circuit board. In an embodiment, the metal wire 151a is disposed above or below the through hole 153, and the metal wire 151a has its two ends fixed to two ends of the body 152 outside the through hole 153 along a width direction (Y direction as shown in FIG. 18).

In this embodiment, an extending direction of the metal wire 151a intersects an extending direction of the through hole 153. A projection of the metal wire 151a in the height direction of the battery module 1 (Z direction as shown in FIG. 8) is located within a projection of the through hole 153 in the height direction of the battery module 1.

In this embodiment, the metal wire 151a extends along a width direction of the battery module 1 (Y direction as shown in FIG. 8), so that an extending direction of the metal wire 151a may be perpendicular to the extending direction of the through hole 153. In this case, each metal wire 151a can monitor one battery cell 11. The extending direction of the metal wire 151a may also intersect the extending direction of the through hole 153, that is, the extending direction of the metal wire 151a may not be perpendicular to the extending direction of the at least one through hole 153 but forms an angle with the extending direction of the through hole 153. In this case, one metal wire 151a can simultaneously monitor two or three battery cells 11. A projection of the metal wire 151a in the height direction (Z direction) of the battery module 1 is partially located within a projection of the through hole 153 in the height direction (Z direction) of the battery module 1.

As an example, the body 152 is provided with a welding pad 154, and the metal wire 151a can be fixed to the body 152 of the circuit board 15 through the welding pad 154. The metal wire 151a may be made of a conductive material such as aluminum or tin, and may be fixed to the body 152 by the welding pad 154.

In an embodiment, the through hole 153 includes a first through hole 153a and a second through hole 153b, and both the first through hole 153a and the second through hole 153b can be strip-shaped holes. Both the first through hole 153a and the second through hole 153b have center lines extending along a direction in which the vents 111 are arranged. In this embodiment, the first through hole 153a has a large size, and the first through hole 153a may have a long strip shape, and extends along the direction in which the vents 111 are arranged. In this way, the first through hole 153a can correspond to multiple vents 111, and the processing of the circuit board 15 is also simpler. In other embodiments, the through hole 153 may further include a third through hole, etc. The number of through holes may be set according to the number of vents. In an example, the through holes may be in one-to-one correspondence with the vents. In another example, a larger through hole (such as the first through hole 153a in this embodiment) corresponds to multiple vents 111, and a smaller through hole (such as the second through hole 153b in this embodiment) corresponds to only one vent 111.

The second through hole 153b can also be provided with the above-mentioned metal wire 151a. In this case, the metal wire 151a can be directly formed in the second through hole 153b. A size of the second through hole 153b can be set according to a layout of the circuit board 15, for example, the size of the second through hole 153b is set to be smaller than a size of the first through hole 153a. An arrangement of the metal wire 151a in the second through hole 153b can be the same as or different from an arrangement of the metal wire 151a in the first through hole 153a, which will not be further described herein.

An embodiment of the present disclosure further provides a battery pack, including a battery management system and the battery module 1 provided by any embodiment of the present disclosure. The temperature sensing device 151 in the battery module 1 is connected to the battery management system to form a circuit. When the circuit is disconnected, the battery management system sends a first alarm signal to a vehicle control module, and the vehicle control module can perform corresponding controls according to the first alarm signal, for example, issuing an alarm to passengers or performing emergency braking on the vehicle.

Further, the battery pack provided by this embodiment of the present disclosure further includes a temperature warning device and a voltage warning device. The temperature warning device can be a thermocouple, a thermistor or a bimetal thermometer, for monitoring a temperature of the battery module and sending a second alarm signal to the battery management system when the temperature exceeds a preset temperature threshold. The above-mentioned temperature warning device can detect a temperature within a range of −40° C. to 600° C., and a temperature of the battery cell can be acquired by connecting the temperature warning device to an electrode terminal of the battery cell by means of welding, bonding and the like.

The voltage warning device is used to monitor a voltage of the battery module and send a third alarm signal to the battery management system when the voltage exceeds a preset voltage threshold. The battery management system can transmit the above-mentioned alarm signal to the vehicle control module. The temperature warning device, the voltage warning device and the metal wire described above are used to monitor, as a whole, the temperature, the voltage and the thermal runaway state of the battery module, thereby improving safety of the battery module. The temperature warning device is electrically connected to the circuit board through a welding pad 155 connected to the temperature warning device, and the voltage warning device is electrically connected to the circuit board through a welding pad 156 connected to the voltage warning device.

The above-described embodiments are merely preferred embodiments of the present disclosure and not intended to limit the present disclosure. Those skilled in the art may make various changes and variations to the present disclosure. However, any modifications, equivalent substitutions and improvements made within the principle of the present disclosure shall fall into the protection scope of the present disclosure.

What is claimed is:

1. A battery module, comprising:
a plurality of battery cells stacked in sequence, the plurality of battery cells being provided with vents; and
a circuit board arranged above the plurality of battery cells, wherein the circuit board is provided with a temperature sensing device, and a position of the temperature sensing device corresponds to positions of the vents,
wherein the temperature sensing device is connected to a battery management system to form a circuit, and the circuit is disconnected when any one of the vents is blasted;
wherein the circuit board comprises a body and at least one through hole formed in the body, and a position of each of the at least one through hole corresponds to positions of one or more of the vents;
wherein the at least one through hole comprises a first through hole, and a position of the first through hole corresponds to positions of at least two of the vents;
wherein the temperature sensing device comprises at least one metal wire etched on the circuit board, and one of the at least one metal wire partitions one of the at least one through hole into a plurality of regions;
wherein both an upper surface and a lower surface of one of the at least one metal wire that are opposite to each other are flush with the body of the circuit board without protruding from surfaces of the body of the circuit board;

wherein the at least one through hole comprises a second through hole, the first through hole and the second through hole each have a strip shape, and the first through hole and the second through hole each extend along a direction in which the vents are arranged; and wherein the first through hole has a size greater than a size of the second through hole, the at least one metal wire comprises a plurality of metal wires, one of the plurality of metal wires partitions the second through hole into a plurality of regions, and a number of at least two of the plurality of metal wires corresponding to the first through hole is greater than a number of at least one of the plurality of metal wires corresponding to the second through hole.

2. The battery module according to claim 1, wherein the plurality of metal wires are arranged in parallel and perpendicular to an extension direction of the at least one through hole in which the plurality of battery cells is stacked.

3. The battery module according to claim 1, wherein each of the at least one metal wire is made of any one of copper, aluminum or tin.

4. The battery module according to claim 1, further comprising:
- a side plate fixed to a side of each of the plurality of battery cells;
- an end plate fixed to an end of each of the plurality of battery cells; and
- an isolation plate arranged above the plurality of battery cells,
- wherein the isolation plate is provided with at least one gas exhaust hole, and the at least one gas exhaust hole corresponds to the vents, and
- the circuit board is arranged on the isolation plate, and the temperature sensing device corresponds to the at least one gas exhaust hole.

5. A battery pack, comprising a battery management system and the battery module according to claim 1;
- wherein the temperature sensing device in the battery module is connected to the battery management system to form a circuit.

6. A vehicle, comprising a battery pack according to claim 5 and a vehicle control module,
- wherein when the circuit is disconnected, the battery management system sends a first alarm signal to the vehicle control module, and
- the vehicle control module is configured to control the vehicle according to the first alarm signal.

7. The vehicle according to claim 6, wherein the battery pack further comprises:
- a temperature warning device configured to monitor a temperature of the battery module and send a second alarm signal to the battery management system when the temperature exceeds a preset temperature threshold; and
- a voltage warning device configured to monitor a voltage of the battery module and send a third alarm signal to the battery system when the voltage exceeds a preset voltage threshold,
- wherein the battery management system transmits the second alarm signal and the third alarm signal to the vehicle control module.

8. A battery module, comprising:
- a plurality of battery cells stacked in sequence, the plurality of battery cells being provided with vents; and
- a circuit board arranged above the plurality of battery cells, wherein the circuit board is provided with a temperature sensing device, and a position of the temperature sensing device corresponds to positions of the vents,
- wherein the temperature sensing device is connected to a battery management system to form a circuit, and the circuit is disconnected when any one of the vents is blasted;
- wherein the circuit board comprises a body and at least one through hole formed in the body;
- wherein the at least one through hole comprises a first through hole, and a position of the first through hole corresponds to positions of at least two of the vents;
- wherein the temperature sensing device comprises at least one metal wire formed on the circuit board, and the at least one metal wire is fixed to the body;
- wherein the at least one metal wire is arranged above or below the at least one through hole, and one of the at least one metal wire has two ends fixed to two ends of the body outside of the at least one through hole along a length direction of the battery module;
- wherein the first through hole corresponds to only one metal wire of the at least one metal wire, and the one metal wire corresponds to the at least two of the vents;
- wherein the at least one through hole comprises a first through hole and a second through hole, the first through hole and the second through hole each have a strip shape, and the first through hole and the second through hole each extend along a direction in which the vents are arranged; and
- wherein the first through hole has a size greater than a size of the second through hole, the at least one metal wire comprises a plurality of metal wires, one of the plurality of metal wires partitions the second through hole into a plurality of regions, and a number of at least two of the plurality of metal wires corresponding to the first through hole is greater than a number of at least one of the plurality of metal wires corresponding to the second through hole.

9. The battery module according to claim 8, wherein the at least one metal wire extends along the length direction, and a projection of the at least one metal wire in a height direction of the battery module on a plane of the circuit board is partially located within a projection of the at least one through hole in the height direction of the battery module on the plane of the circuit board.

10. The battery module according to claim 8, wherein the at least one metal wire is arranged above or below the at least one through hole, and the at least one metal wire has two ends fixed to two ends of the body outside of the at least one through hole along a width direction of the battery module.

11. The battery module according to claim 10, wherein the at least one metal wire extends in the width direction, or a direction in which the at least one metal wire extends intersects a direction in which the at least one through hole extends, and a projection of the at least one metal wire in a height direction of the battery module is partially located within a projection of the at least one through hole in the height direction of the battery module.

12. The battery module according to claim 8, wherein the body is provided with at least one welding pad, and the at least one metal wire is fixed to the body through the at least one welding pad.

13. A battery module, comprising:
- a plurality of battery cells stacked in sequence, the plurality of battery cells being provided with vents; and
- a circuit board arranged above the plurality of battery cells, wherein the circuit board is provided with a temperature sensing device, and a position of the temperature sensing device corresponds to positions of the vents, wherein the temperature sensing device is connected to a battery management system to form a circuit, and the circuit is disconnected when any one of the vents is blasted;

wherein the circuit board comprises a body and at least one through hole formed in the body, and a position of each of the at least one through hole corresponds to positions of one or more of the vents;

wherein the at least one through hole comprises a first through hole, and a position of the first through hole corresponds to positions of at least three of the vents;

wherein the temperature sensing device comprises at least three metal wires formed on the circuit board, and the at least three metal wires are fixed to the body;

wherein the at least three metal wires are arranged above or below the at least one through hole, and each of three of the at least three metal wires has two ends fixed to two ends of the body outside of the at least one through hole along a length direction of the battery module;

wherein the first through hole corresponds to three of the at least three metal wires;

wherein the at least one through hole comprises a second through hole, the first through hole and the second through hole each have a strip shape, and the first through hole and the second through hole each extend along a direction in which the vents are arranged; and wherein the first through hole has a size greater than a size of the second through hole, the at least one metal wire comprises a plurality of metal wires, one of the plurality of metal wires partitions the second through hole into a plurality of regions, and a number of at least two of the plurality of metal wires corresponding to the first through hole is greater than a number of at least one of the plurality of metal wires corresponding to the second through hole.

* * * * *